United States Patent [19]

Wells et al.

[11] 4,292,568

[45] Sep. 29, 1981

[54] METHOD AND APPARATUS FOR HEATING AND COMPRESSING PLASMA

[75] Inventors: Daniel R. Wells, Miami, Fla.; Joseph J. Packo, Austin, Tex.

[73] Assignee: Triosops, Inc., Austin, Tex.

[21] Appl. No.: 21,207

[22] Filed: Mar. 16, 1979

[51] Int. Cl.$^2$ .............................................. G21B 1/00
[52] U.S. Cl. ................................... 315/111.4; 176/1; 315/111.7
[58] Field of Search ............... 315/111.2, 111.4, 111.7; 176/1, 3, 4; 313/231.3

[56] References Cited

U.S. PATENT DOCUMENTS

| | | | |
|---|---|---|---|
| 3,664,921 | 5/1972 | Christofilos | 176/4 |
| 4,068,147 | 1/1978 | Wells | 315/111.4 |
| 4,156,832 | 5/1979 | Kistemaker et al. | 315/111.4 |

Primary Examiner—Eugene R. LaRoche
Attorney, Agent, or Firm—Browdy and Neimark

[57] ABSTRACT

A thermonuclear reactor of the TRISOPS type wherein plasma vortex structures are generated by coaxial theta pinch guns, the plasma vortex structures being compressed and amplified by secondary compression provided by the use of compression coils acting through a stabilized collapsing Lithium or FLIBE, or other suitable molten liner. The molten metal liner is deposited on a refractory metal mesh held normally adjacent the inside surface of a suitable vacuum chamber. This mesh is held near the inside surface of the vacuum chamber by an articulated collapsible cable assembly which is collapsible toward the center line of the chamber, and after collapse returns the mesh to an expanded configuration adjacent the wall of the chamber.

11 Claims, 6 Drawing Figures

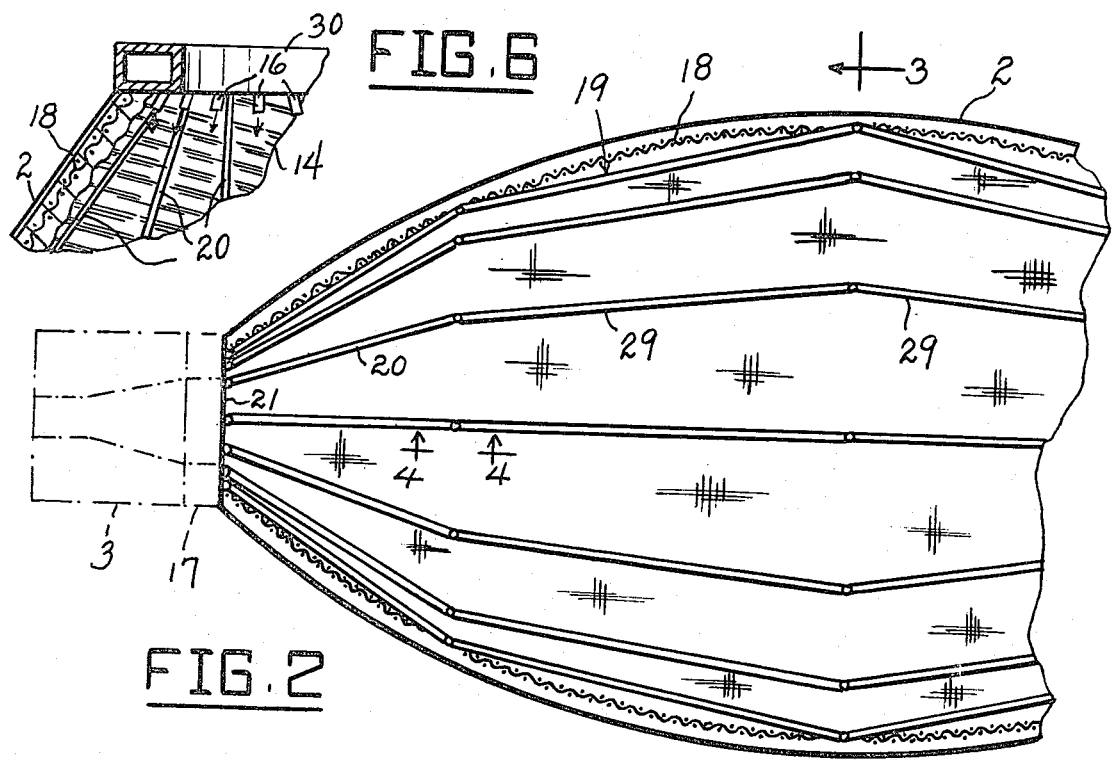
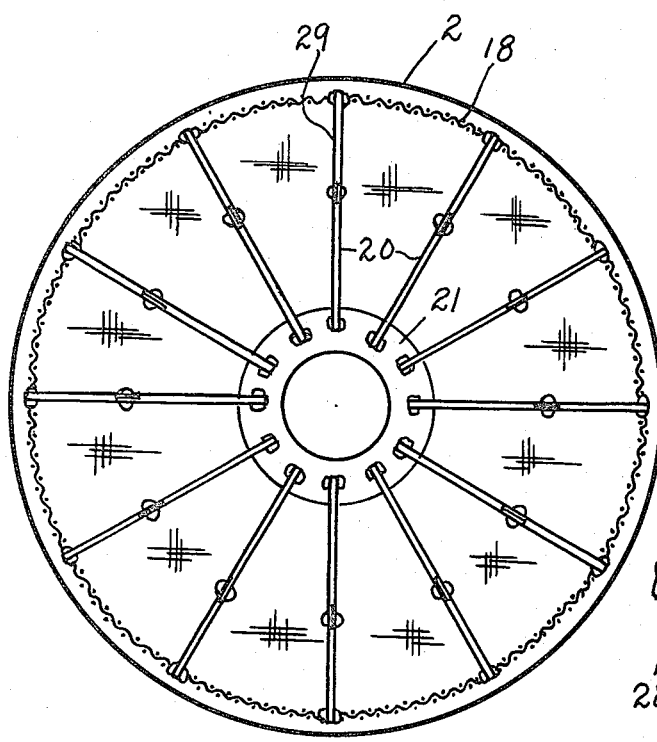
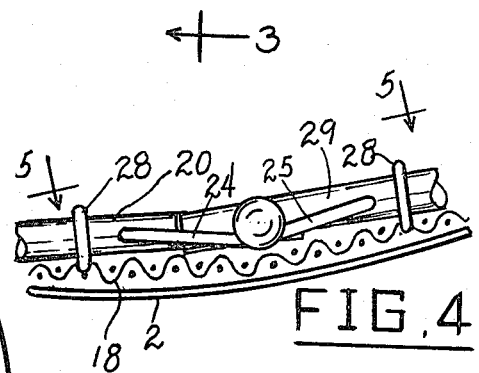
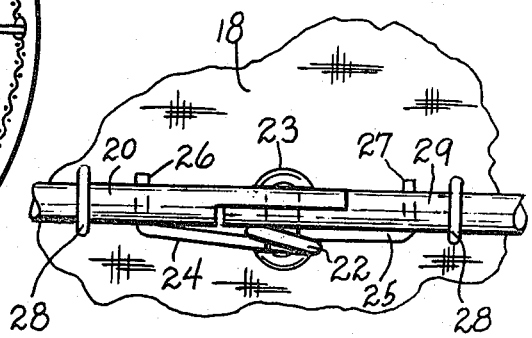

METHOD AND APPARATUS FOR HEATING AND COMPRESSING PLASMA

FIELD OF THE INVENTION

This invention relates to systems for generating energy by thermonuclear processes, and more particularly to an improved system employing a thermonuclear reactor of the TRISOPS.

BACKGROUND OF THE INVENTION

As stated in U.S. Pat. No. 4,068,147 to Daniel R. Wells, there is a need for new techniques that will permit the construction of power generating stations that are relatively small when compared to conventional thermonuclear reactor designs. It is desirable that full size power generating thermonuclear reactors be built in sizes approximately 1000 times smaller than those possible with currently proposed designs. This would enable the utilization of these power plants, for example, in spacecraft intended for deep space missions. Such compact nuclear power plants could also be utilized for marine propulsion. Also, there is a need for a system suitable for facilitating substantially direct conversion of thermonuclear energy to electrical energy without the necessity of employing complex thermal cycle machinery.

For various reasons, the currently available systems are not adequate to satisfactorily meet the above needs. Although heating plasma structures entirely by conieal theta pinch compression fields provides a basic solution, previous systems relying essentially on this technique have failed because it involves heating a plasma ring that is moving with respect to the theta pinch coils. This results in a very low coefficient of coupling and a very inefficient heating process. Furthermore, the rate of rise of the compression field must be very fast, thereby requiring the use of expensive and complex equipment.

Therefore, there currently exists a need for more efficient and inexpensive means for compressing and heating plasma in thermo-nuclear devices.

SUMMARY OF THE INVENTION

Accordingly, a main object of the present invention is to provide an improved system for generating energy by a thermo-nuclear process which overcomes the deficiencies and disadvantages of the previously employed systems.

A further object of the invention is to provide an improved method and apparatus for generating electrical energy by thermonuclear processes which utilizes an improved useful geometrical arrangement of the components of reactors of the TRISOPS type.

A still further object of the invention is to provide an improved nuclear reactor of the theta pinch coil type in which the compression coils act through a collapsing Lithium, FLIBE, or other suitable molten metal liner and wherein the liner can be collapsed onto the plasma vortex rings at the center of the reactor chamber after said rings have collided.

A still further object of the invention is to provide an improved thermonuclear reactor of the TRISOPS type employing compression coils acting through a collapsing molten metal liner, the liner having flexible stabilizing supporting means, including means to bias it toward the inside wall surface of the associated vacuum chamber.

A still further object of the invention is to provide an improved thermonuclear reactor of the TRISOPS type employing compression coils acting through a collapsible molten metal liner, wherein part or all of the molten metal liner may comprise Uranium 238, Thorium 232, or similar thermonuclear fuel material, to provide for neutron capture in fertile material in order to produce fissile fuel, such as Plutonium 239 or Uranium 233, for use in fission reactors, and wherein the liner may or may not produce heat energy for use in generating electrical energy.

The present invention comprises an improved method and means for compressing plasma vortex structures by means of a stabilized collapsing molten metal liner. The molten metal liner is "spun" substantially onto the inside surface of a suitable vacuum chamber which is preferably placed in an upright or vertical position so that the molten metal, which is swirled into the liner by a suitable set of nozzles, deposits at the bottom of the vessel where it is pumped out of the chamber, processed, and returned to the top of the chamber. This swirling molten metal liner is stabilized by a flexible metal mesh constructed of stainless steel or other suitable refractory metal. This mesh is normally held near the inside surface of the vaccum chamber by a "scissor-like" articulated cage structure which allows collapse of the liner toward the center line of the chamber, and after the collapse immediately returns the mesh to the wall of the chamber.

After the molten liquid metal liner has been swirled onto the collapsible supporting structure adjacent the inside surface of the vacuum chamber, a set of vortex structures or matrices are fired into the chamber from each end through openings in the mesh. These vortex structures move to the center of the vacuum chamber and stop. At this instant a suitable timing mechanism activates a set of compression coils surrounding the chamber. The rapidly rising magnetic field generated by these coils induces large electrical currents in the swirling liner. The electromagnetic Lorentz forces drive the liner toward the axis of the chamber, thus trapping any magnetic fields inside the chamber and increasing the intensity of these fields as the liner collapses. These increasing fields in turn compress and heat the stable vortex structures to thermonuclear temperatures.

The entire apparatus operates in a surrounding steady-state magnetic field which allows formation of the vortex structures by the theta pinch guns or ejectors and acts as a "seed" field inside the collapsing liner, which rapidly increases as the liner approaches the center line of the apparatus. Once the compression coils have accelerated the heavy liner toward the central axis, the inertia of the liner forces the hot metal against the compressed seed field, increasing the seed field and heating the plasma structures.

The metal mesh is tightly woven so that there can be little or no flow of molten metal through it. The articulated scissor cage mechanism is designed so that it holds the mesh against the inner wall surface of the vacuum chamber until the collapse begins. During collapse, this mechanism closes the ends of the mesh so that no plasma can escape. Spring loading then returns the mesh to the wall and opens the ends of the mesh so that a new set of vortex rings can enter the chamber through the ends.

BRIEF DESCRIPTION OF THE DRAWINGS

Further objects and advantages of the invention will become apparent from the following description and claims, and from the accompanying drawings, wherein:

FIG. 2 is a fragmentary longitudinal vertical cross-sectional view taken through the vacuum chamber of the system of FIG. 1.

FIG. 3 is a transverse cross-sectional view taken substantially on line 3—3 of FIG. 1.

FIG. 4 is an enlarged fragmentary cross-sectional view taken substantially on line 4—4 of FIG. 2.

FIG. 5 is a view taken substantially on the line 5—5 of FIG. 4.

FIG. 6 is an enlarged fragmentary cross-sectional detail view showing part of the swirled-on molten metal liner and the nozzles for applying same, as employed in the system of FIG. 1.

DESCRIPTION OF A PREFERRED EMBODIMENT

Figure 1:
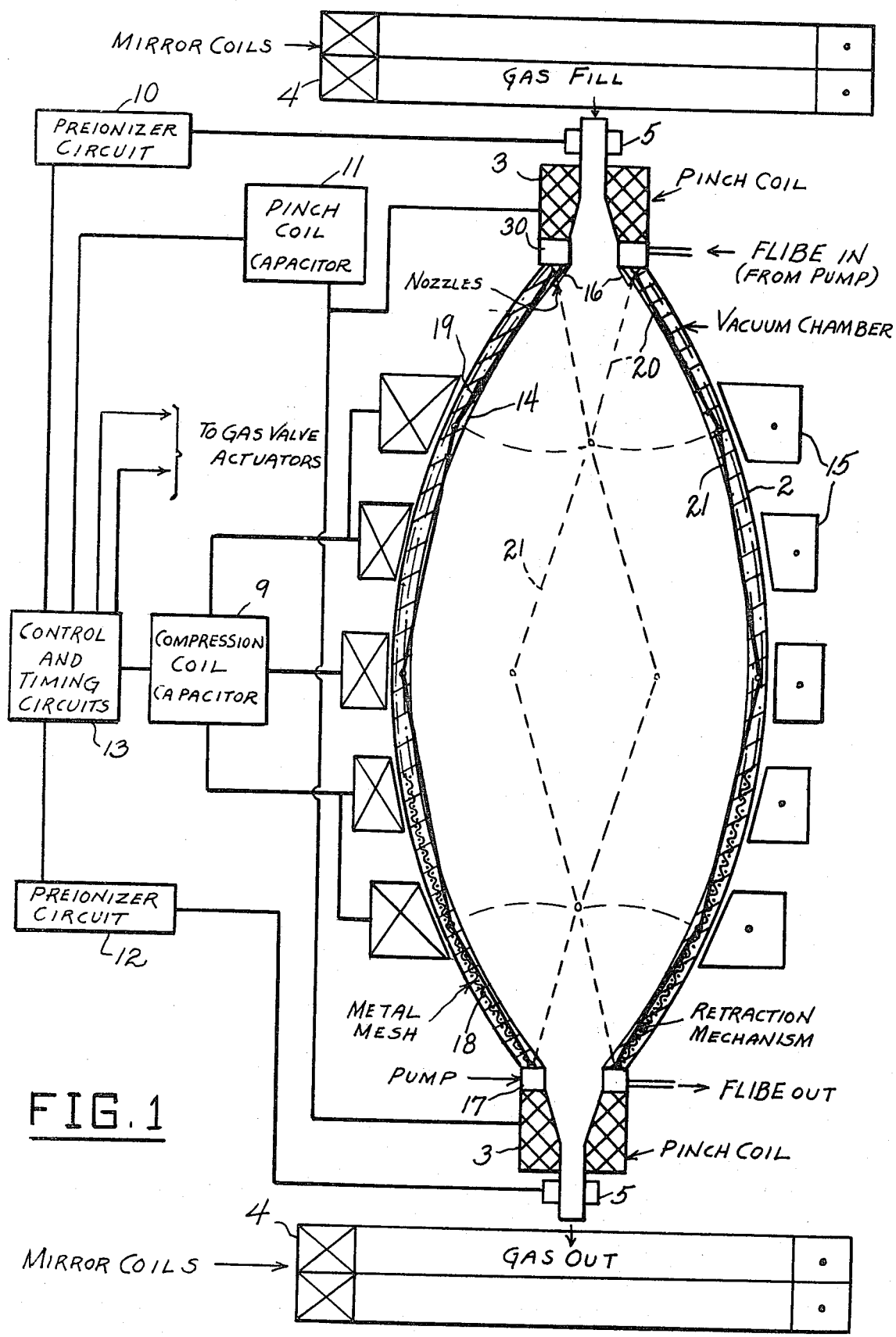
FIG. 1 is a block diagram of an improved thermonuclear reactor system constructed in accordance with the present invention.

Referring to the drawings, designated at 2 is a vacuum chamber generally similar to that disclosed in U.S. Pat. No. 4,068,147, the vacuum therein being maintained by suitable means, not shown. Plasma vortex structures or rings are generated by theta pinch guns 3 and are injected thereby into the vacuum containment vessel 2. Plasma is supplied to pinch guns 3 from the system gas supply through suitable gas valves, not shown, and preionizers 5. The theta pinch guns 3 are driven from pinch gun capacitor 11. The preionizers 5 are driven by preionizer driving circuits 10 and 12. Pulsed operation of the system is accomplished by controlling the associated gas valve actuators, not shown, the pinch guns 3 and the preionizers 5 by control and timing circuits 13. The plasma rings generated by pinch guns 3 are confined and guided to the center of containment vessel 2 by means of a steady state magnetic mirror field generated by primary magnetic mirror coils 4. A secondary magnetic mirror field for accelerating and collapsing a molten metal liner 14 is established by compression coils 15 which are driven by a compression coil capacitor bank 9 in response to pulses provided by control and timing circuits 13.

The operation of the above-described assembly is generally similar to that described in U.S. Pat. No. 4,068,147. A plasma ring moving parallel to the primary mirror field has its velocity and magnetic fields anti-parallel (contra-rotational). A plasma ring moving anti-parallel to the primary mirror field has its velocity and magnetic fields parallel (co-rotational). Both rings are force-free, e.g., $\vec{J} \times \vec{B} = 0$ and $(\nabla \times \vec{V}) \times V = 0$. Thus, the contra-rotational ring is right-handed in $B_\theta + B_\phi$ and the co-rotational field is left-handed in $B_\theta + B_\phi$, where $B_\theta$ is the toroidal component of the trapped magnetic induction field and $B_\phi$ is the corresponding trapped poloidal field. They then collide and are amplified and compressed by the secondary mirror system located at the center of the primary mirror system. The current flow in the secondary compression coils 15 is in the same direction as the currents flowing in the primary mirror coils 4. Thus, by Lenz's law they both compress the vortex rings and amplify their currents. The diamagnetic currents in the rings increase as the current in the secondary compression coils increases. The toroidal currents in the two rings are in the same direction. The poloidal-current components are in opposite directions. The ring currents are left-handed and right-handed helices.

In one typical embodiment according to the present invention the vacuum chamber had an 8-inch outside diameter and the center line distances between the compression coils was 12 inches. The base pressure in the vacuum system was $3 \times 10^{-6}$ Torr. Deuterium gas was admitted by the pulsed gas valves. The preionizers consisted of a set of conical arc guns which strike an arc in the gas when it drifts into the preionizer region of the chamber. The effective gas pressure in the preionizers was 40 mTorr. The conical theta pinches 3 were powered by a single General Electric "clamshell" capacitor rated at 1 $\mu$F, 50 kV. The quarter cycle rise time on the theta pinches was 0.5 $\mu$sec. They ring out in 3 $\mu$sec. The peak magnetic fields in the throats of the theta pinch guns were 20 kG at 18 kV. The secondary compression coils were powered by a ¼ MJ capacitor bank 9 consisting of a series-parallel combination of 15 $\mu$F capacitors rated at 20 kV. The current rose to a peak value in 19.6 $\mu$sec. A "crowbar" was activated at peak current. The decay time for the circuit was 30 $\mu$sec. The peak magnetic field produced by the secondary compression coils was 35 kG at 20 kV.

Since the rings, after collision, are stationary in the laboratory frame, the coupling problem is no longer critical, and very large currents and mass motions can be induced in the double-ring system. The macroscopic toroidal conduction currents in the rings produce a long-range attraction force which draws them together; the vortex forces (mass flow forces) and poloidal conduction currents (which are strongest near the surface of the rings and produce a short-range force) force them apart. Thus, they oscillate axially at the center of the primary mirror when the secondary mirror is applied. There is no apparent limit to the size of the currents that can be induced or in the amount of compression that can be obtained without producing any instability in the rings.

The swirling molten metal liner 14 can be FLIBE, molten Lithium, or other suitable material. A set of nozzles 16 on the annular end header portion 30 of the chamber swirls the metal onto the inside wall region of the chamber. The molten metal is circulated by providing suitable pump means 17 at the bottom end of the chamber, as viewed in FIG. 1. The excess metal is pumped out at the bottom of the chamber by the pump assembly 17 and is returned to the top end. A mesh liner 18 is used adjacent the inside surface of the chamber wall for stabilizing the swirling molten metal. A retraction mechanism, shown generally at 19, is employed with the mesh liner 18.

As above stated, a steady state magnetic seed field is produced by the pair of mirror coil assemblies 4, 4. The vortex rings are generated by the set of plasma guns 3, 3. These guns act on the Deuterium or other suitable gas which fills the chamber. The compression coils 15 act to collapse the liner 14.

As shown in FIGS. 2 to 5, retraction mechanism 19 may be in the form of an articulated cage-like structure comprising identical linkages equally spaced apart in radial planes, for example, in radial planes 30° apart around the longitudinal axis of the chamber 2. The linkages may each comprise a relatively short link rod 20 pivotally connected at one end to the annular wall 21 of the pump assembly 17 and at the other end to a relatively long link rod 29, which extends to the central transverse plane of the chamber and is there pivotally connected to the end of a symmetrically similar link rod 29, which in turn is connected by a short link rod 20 to the opposite annular end wall member 30. The link rods are spring-loaded at their pivotal connections to urge the cage-like mechanism 19 to an expanded condition. For example, coil springs 22 may surround and be supported by the oppositely headed connecting pins 23 at the link rod connections, as shown in FIG. 5, the springs being provided with opposite end arms 24, 25 having right-angled end portions 26, 27 diametrically engaged through the connected link rods so as to transmit the outward spreading biasing forces from the springs 22 to the linkage rods. The link rods are suitably secured, as by ring clips 28, to the mesh liner 18, as shown in FIGS. 4 and 5.

The cage-like "scissors" mechanism 19, fastened to the flexible mesh liner 18, laden with molten metal, forms a structure which is collapsible to the dotted configuration shown centrally in the chamber 2 in FIG. 1. Thus, the composite liner structure is spring-loaded and is constructed in such a way that it closes the ends of the composite liner during the collapse thereof, and then returns the structure to the vacuum chamber wall so that the ends of the liner are again open to admit the next set of vortex rings. The scissors assembly holds the mesh against the wall and inside the swirling molten liner metal in a "sandwich" configuration until the next collapse cycle.

As was previously mentioned, after the molten metal liquid liner material has been swirled onto the flexible mesh 18 adjacent the inside surface of the vacuum chamber 2, a set of vortex structures or matrices are fired into the chamber from each end and through the end openings defined by the expanded liner assembly. These vortex structures move to the center of the vacuum chamber and stop. At this instant the timing mechanism 13 activates the set of compression coils 15. The rapidly rising magnetic field generated by these coils induces large electrical currents in the swirling liner 14. The electromagnetic Lorentz forces drive the liner toward the axis of the chamber, thus trapping any magnetic fields contained in the liner and increasing the intensity of these fields as the liner collapses. These increasing fields in turn compress and heat the stable vortex structures to thermonuclear temperatures.

The steady state surrounding magnetic field acts as a "seed" field inside the collapsing liner, which rapidly increases as the liner approaches the center line of the apparatus. Once the compression coils 15 have accelerated the heavy liner 14 toward the axis, the inertia of the liner forces the hot metal against the compressed seed field, increasing the seed field and heating the plasma structures.

The metal liner mesh 18 is formed of flexible stainless steel, or other suitable flexible refractory metal, and is tightly woven so that there can be little or no flow of molten metal through it. The scissors mechanism holds the mesh against the inner wall of the vacuum chamber until the collapse begins. During collapse this mechanism closes the ends of the mesh structure so that no plasma can escape. At the end of the compression cycle the springs 22 return the mesh to the chamber wall so that a new set of vortex rings can enter the chamber through the open ends of the liner enclosure.

It is to be noted that while the mesh 18 plays an important part in stabilizing the liner 14 during collapse, the concept of collapsing a molten metal liner onto vortex structures in order to heat them to thermonuclear temperatures, in accordance with the present invention, is valid for any other kind of mechanism or mechanisms which would stabilize the liner. In other words, any other suitable liner stabilizing means which can retain the swirling molten metal can be employed in place of the mesh 18, within the spirit of the present invention.

From the above description it will be seen that the method and apparatus of the present invention achieve the general objects above set forth. Furthermore, the objects are successfully achieved due to the fact that the compression occurs after the vortex rings are stationary in the containment vessel or laboratory frame. This allows the compression coils to have a very high electrical coupling coefficient with the plasma vortex rings, and thus considerable electrical current and mass motion amplification are possible.

A second inherent advantage of the method of the present invention is that the efficient amplification of the currents and mass motions in the stationary plasma rings results in a turbulent heating of the plasma in times short as compared to those usually obtained by conventional methods of heating.

A third and highly important advantage is that the woven metal mesh 18 sandwiched between two layers of molten metal stabilizes the liner as it collapses onto the plasma vortex structures. This prevents the principal difficulty encountered with a collapsing liner system, i.e., the inherent instability of the collapsing liner. The liner assembly including the mesh is constructed in such a way that after collapse the mesh returns to its original configuration near the vacuum chamber wall so that a new liner can be spun around it in preparation for the next cycle of collapse.

The system of the present invention further has advantages even over conventional machines employing slow rise time heating because in this system the vortex rings are generated by a simple easy-to-build conical theta pinch gun which generates the required ring structure in a simple way and does not require the use of the very elaborate machinery necessary to generate similar structures in conventional geometries. The vortex rings are naturally-occurring stable structures which bring themselves to a stationary position in the laboratory frame by their own action on each other. The secondary compression is then applied by a simple slow-rise-time coil or coils.

A further important advantage of the collapsing liner system of the present invention is that the collapsing liner keeps the neutrons from bombaring the surrounding coils and structure, which otherwise would be quickly destroyed by the thermonuclear neutrons.

It is to be understood that part or all of the Lithium or FLIBE blanket in liner 14 may be replaced by $238_U$ and/or $232_{Tn}$ (Uranium 238 and/or Thorium 232) to provide for neutron capture in fertile material in order to produce fissile fuel $239_{Pu}$, $233_U$ (Plutonium 239, Uranium 233) for use in fission reactors. The blanket, under these circumstances, may or may not produce heat energy for use in generating electricity.

While a specific embodiment of an improved thermonuclear reactor system has been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiment.

What is claimed is:

1. Apparatus for heating and compressing plasma comprising a vacuum chamber, means for generating a containment seed field in the chamber, means for generating plasma and confining said plasma in said vacuum chamber, means forming plasmoids in said chamber having a plasma configuration in which plasma mass flow in the chamber is predominantly along an axis extending in a direction parallel to said containment seed field, means for urging the plasmoids toward collision with each other, a collapsible molten metal liner in said chamber surrounding said plasmoids and means for collapsing said liner on the plasmoids after said collision with each other, to amplify said seed field and heat the plasmoids to thermonuclear temperature, and wherein said liner includes a flexible metal mesh sandwiched in the molten metal for stabilizing the liner during collapse.

2. The apparatus of claim 1, and a cage-like articulated member mounted in said chamber and defining an inwardly collapsible support for the flexible metal mesh.

3. The apparatus of claim 2, and wherein said cage-like articulated member is arranged to close off the opposite ends of the liner when said liner is collapsed and to define a confining enclosure for the colliding plasmoids.

4. The apparatus of claim 3, and means biasing said cage-like articulated member toward an expanded configuration with the opposite ends of the liner held open.

5. The apparatus of claim 3, and wherein said cage-like articulated member comprises a plurality of equally angularly spaced identical linkages extending in radial planes relative to the longitudinal axis of the chamber, and spring means acting on the respective linkages and urging the linkages outwardly toward the longitudinal peripheral wall of the chamber.

6. The apparatus of claim 5, and wherein the linkages are substantially symmetrical relative to the transverse central plane of the chamber, and wherein the end links of the respective linkages are relatively short as compared with the inner links thereof so as to define end closures for the liner when collapsed.

7. The apparatus of claim 1, and wherein said means for collapsing said molten metal liner comprises compression coil means surrounding the chamber and acting electromagnetically on the liner.

8. The apparatus in accordance with claim 7, wherein said liner comprises a cage-like articulated inwardly collapsible support mechanism mounted longitudinally in the chamber, means securing said flexible metal mesh member to said cage-like support mechanism, means biasing said cage-like articulated support mechanism outwardly to an expanded configuration, and means for swirling the molten metal onto said flexible metal mesh member.

9. The apparatus of claim 8, and wherein said cage-like articulated support mechanism comprises a plurality of radial linkages which are substantially symmetrical relative to the transverse central plane of the chamber and are located in equally spaced radial planes around the longitudinal axis of the chamber.

10. The apparatus of claim 8, and means for circulating the molten metal longitudinally of the chamber in a swirling pattern on said mesh member.

11. The apparatus of claim 8, and wherein said inwardly collapsible support mechanism has end portions arranged to form respective opposite end closures for the liner when said liner is collapsed.

* * * * *